United States Patent [19]

Inui et al.

[11] Patent Number: 4,524,368

[45] Date of Patent: Jun. 18, 1985

[54] THERMAL HEAD DRIVE CIRCUIT

[75] Inventors: Toshiharu Inui; Haruhiko Moriguchi, both of Kanagawa, Japan

[73] Assignee: Fuji Xerox Co., Ltd., Tokyo, Japan

[21] Appl. No.: 595,338

[22] Filed: Mar. 30, 1984

[30] Foreign Application Priority Data

Apr. 1, 1983 [JP] Japan ................................ 58-55265

[51] Int. Cl.³ ............................................ G01D 15/10

[52] U.S. Cl. ................................ 346/76 PH; 219/216

[58] Field of Search ........................ 346/76 R, 76 PH; 219/216, 216 PH; 400/120; 250/316.1, 317.1, 318; 358/78; 101/93.04, 93.03

[56] References Cited

U.S. PATENT DOCUMENTS 4,364,063 12/1982 Anno et al. .................. 219/216 PH 4,415,908 11/1983 Sugiura ........................ 219/216 PH

*Primary Examiner*—E. A. Goldberg
*Assistant Examiner*—A. Evans
*Attorney, Agent, or Firm*—Finnegan, Henderson Farabow, Garrett & Dunner

[57] ABSTRACT

A thermal head drive circuit with the input connected to a source of printing data and the output connected to a thermal head including heater elements, so as to improve the picture quality of a thermal head recording apparatus for printing successive lines. Improved picture quality is effected by using data from previously printed lines to compute a corrected pulse energy for the line being printed. The circuit uses a heat storage state operator for operating the heat storage state of each of the heater elements constituting a thermal head, a pulse energy operator for computing a printing pulse energy to be applied to each of the heater elements, a memory for storing the electrical pulse energy used in the previously printed line, and a counter to count the number of dots on the line to be printed. The pulse energy operator uses data from the heat storage state operator, the counter, and from the memory which has data on the pulse energy used in previously printed lines. The output of the pulse energy operator is connected to a pulse generator which is used to drive the heater elements of a thermal head.

10 Claims, 10 Drawing Figures

THERMAL HEAD DRIVE CIRCUIT

FIELD OF THE INVENTION

The present invention relates to a thermal head drive circuit for use in a thermal recording apparatus such as facsimile equipment or a printer which employs a thermal head.

DESCRIPTION OF THE PRIOR ART

A thermal recording apparatus, in which recording is thermally formed by using a thermal-sensitive recording paper of a thermal-sensitive medium, is widely used in facsimile equipment. In such a thermal recording apparatus, a thermal head in which a matrix of individually actuatable heater elements are aligned usually is used as a printing head. Thermal energy generated from the thermal head for printing but retained in the head, can cause degradation in picture quality.

A typical problem is storage of heat in high speed recording. The heat generated in heater elements during current induction is partly used for printing and partly radiated through a substrate of the printer. However, when the thermal heater is driven at a high speed below a printing cycle of 10 milliseconds, the next printing operation may be initiated before heat has been sufficiently radiated so that heat is stored in at least some heater elements, resulting in non-uniformity of temperature in the respective heater elements in recording so that printed dots may be different from each other in size and/or in density. The printing density may be affected by the number of heater elements which are energized at the same time.

To cope with such deterioration in picture quality due to thermal energy, this invention sets the printing head energy at an optimum value by line, by adjusting the voltage or pulse width to be applied to the thermal head. FIG. 1 is a block diagram showing the schematic arrangement of a conventional thermal head drive circuit. In this circuit, bits for printing black dots included in a printing data 12 supplied to a thermal head 11 are counted by a counter 13 by line. A control signal 14 in accordance with the value of count is applied to a thermal energy control circuit 15. The thermal energy control circuit 15 may be either a pulse amplitude setting circuit or a pulse width setting circuit, and adjust pulses 16 to be applied to respective heater elements when the thermal head 11 performs its printing operation onto the next line with respect to which the counter had performed its counting operation.

The problem of degradation in picture quality from the thermal energy generated from the thermal head for printing cannot be prevented by uniform control of the whole thermal head nor can it be prevented with respect to the individual heater elements. Such a uniform control allows the local temperature to rise or to fall on the individual heater elements, and results in degradation in printing quality.

Consequently, a need exists for improvements in thermal head drives of this type in which thermal energy to be supplied to respective heater elements is individually adjusted to thereby obtain stable printing quality.

SUMMARY OF THE INVENTION

The present invention provides a drive circuit for a thermal sensitive recording apparatus with a heat storage state operator for operating the heat storage state of each of heater elements constituting a thermal head, a pulse energy operator for computing a printing pulse energy to be applied to each of the heater elements by using input data including at least printing pulse energies applied to the thermal head during the printing operation for the line before and the heat storage state, when printing is performed by a line sequential recording method, and a counter for counting the number of dots to be printed on the line on which printing is going to be printed, so that the result of operation of the heat storage state operator or the pulse energy operator is corrected in accordance with the result of counting of the counter. In this invention, pulse energy is defined to vary either with the pulse width or with the pulse amplitude. Varying the pulse width is used in the following embodiment to illustrate the invention.

DESCRIPTION OF THE PREFERRED EMBODIMENTS

Figure 2:
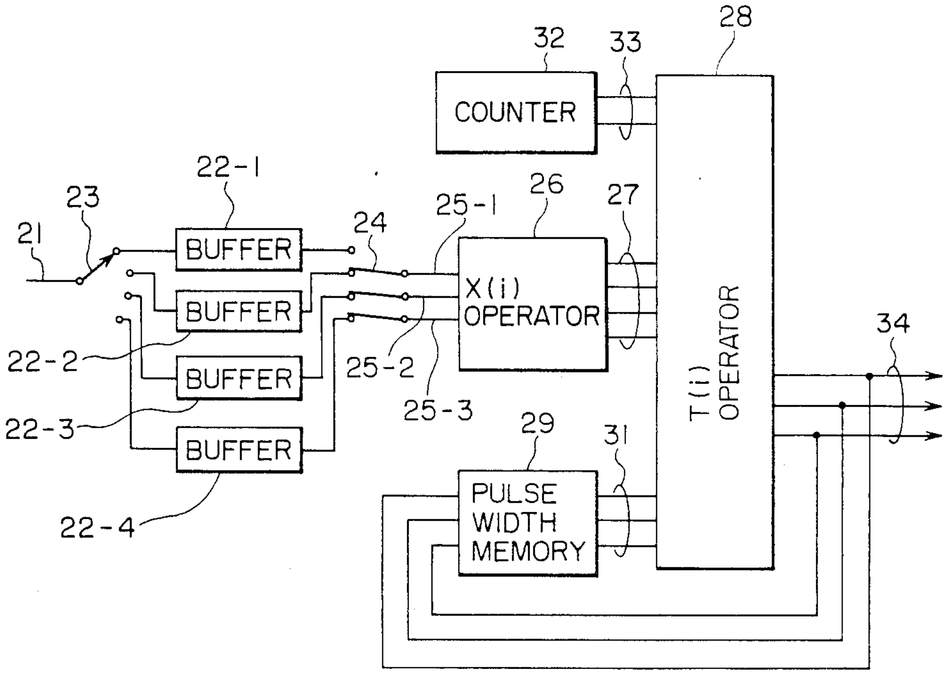
FIG. 2 is a block diagram showing schematic arrangement of a head drive circuit illustrating the present invention.

FIG. 2 shows a thermal head drive circuit in an embodiment of the present invention. The circuit is provided with four line buffers 22-1 to 22-4 into which printing data 21 are successively written by line. A selector 23 is supplied with a not-shown line synchronous signal and cyclically changes over its contact every time one line of the printing data 21 is supplied thereto. In the state where the selector 23 is selecting the first line buffer 22-1, as shown in FIG. 2, the fourth line buffer 22-4 stores the printing data for the line onto which printing or recording is going to be made next. At this time, the third and second buffers 22-3 and 22-2 store the printing data for the previously printed line, and the line before the previously printed line, respectively. At the respective output sides of the line buffers 22-1 to 22-4 there is provided a selector 24 for selecting three line buffers other than the line buffer into which the printing data is now being written.

In the state as shown in the drawing, the printing data is being written into the first line buffer 22-1. At this time, the respective output sides of the other three line buffers 22-2 to 22-4 are selected. The printing data 25-1 to 25-3 selected by the selector 24 are inputted into an X(i) operator 26. The X(i) operator 26 is for operating the state of heat storage. The operation output signals 27 of the X(i) operator 26 are supplied to a T(i) operator 28. The T(i) operator 28 is for computing thermal energy to be applied to individual heater elements of a not-shown thermal head to thereby set the width of pulse to be applied to each of the heater elements in accordance with the computation. The T(i) operator 28 determines the respective pulse widths for the line onto which recording is going to be performed by using three kinds of data, namely the operation output signals 27, output signals of a pulse width memory 29 storing the respective pulse widths for the line before, and black dot signals 33 produced from a counter 32. The black dot signals 33 represent the number of black dots by a ratio thereof occupying the line being printed now (hereinafter referred to as a black dot ratio R). Pulse width signals 34 determined for the respective heater elements are then supplied to a thermal-head pulse-voltage application circuit which will be described later.

In this thermal head drive circuit, the state of heat storage and the state of the number of black dots for one line are grasped so as to determine the printing pulses. To this end, in this embodiment, printing pulses are tentatively determined in the first step on the basis of the state of heat storage. The black dot ratio R for the line onto which printing is going to be performed now is corrected so as to finally determine the printing pulses in the second step. For explanation's sake, the widths of the printing pulses obtained in the first step are represented by T(i1) and those of the printing pulses finally obtained in the second step are represented by T(i2).

Figure 3:
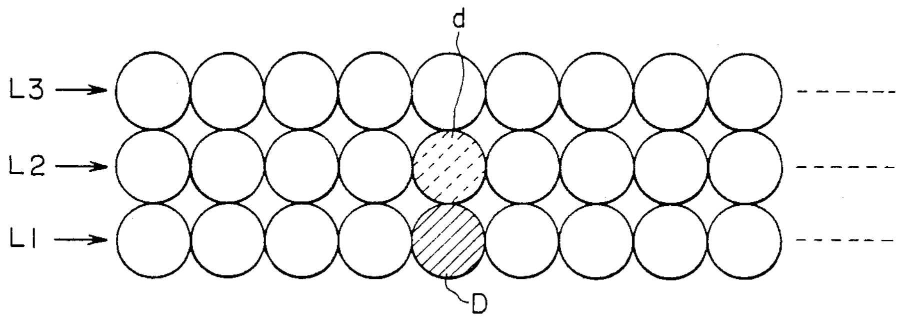
FIG. 3 is an explanatory diagram showing data trains for three lines of the circuit of FIG. 2.

FIG. 3 is a diagram for explaining the principle of determination of printing pulses to be applied to the respective heater elements. The lowermost data train L1 in FIG. 3 shows data by picture element for the line onto which recording is now going to be performed. The data train L2 just over the data train L1 shows data by picture element for a previously printed line in the time base and the uppermost data train L3 shows data by picture element for a line printed before the just previously printed line. In the data train L1, pay attention to a hatched data D. The optimum pulse width applied to the heater element corresponding to this data D is T(i2). The heat storage at this position is assumed to be X(i). Further in the data train L2, assume that the corresponding data for the same heater element as the data D is d, and that the pulse width which has been applied to this heater element in accordance with the data d is t(i2). In this thermal head drive circuit, further assume that the pulse width per se is determined for each heater element regardless of the existence of printing requirement. Thus, printing is determined directly on the basis of the pulse width per se and is not determined by the fact that a pulse voltage is applied to the individual heater element.

In this case the optimum pulse width to be applied to the heater element corresponding to the data D can be expressed by the following equation:

$$T(i2)=f[X(i),t(i2),R]$$

where R represents the black dot ratio for the line onto which printing is now going to be performed.

Figure 1:
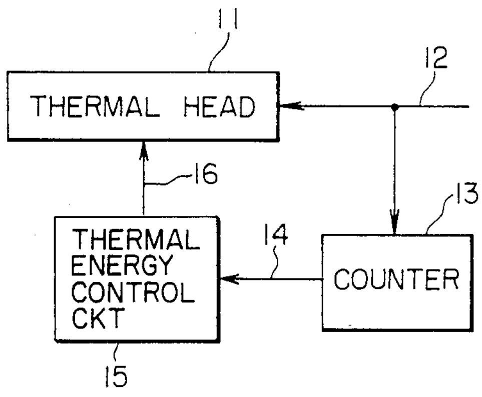
FIG. 1 PRIOR ART
FIG. 1 is a block diagram showing schematic arrangement of a conventional thermal head drive circuit.
Figure 4:
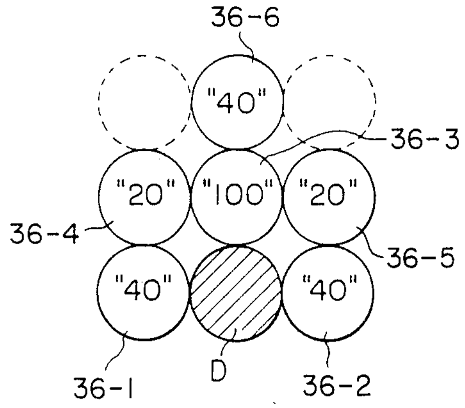
FIG. 4 is an explanatory diagram showing the relation among various data for explaining the principle of computing the heat storage state of the invention.

FIG. 4 shows the principle of computing the heat storage state X(i) in the above equation. In this embodiment, the heat storage state X(i) is computed on the basis of six data 36-1 to 36-6 disposed around the data D and indicated by a solid line. The heat storage state X(i) is obtained by adding predeterminedly weighted black data (printing data) among these data 36-1 to 36-6. The weighting may be represented by "40" for the data 36-1 and 36-2 for the line L1, "20" for the data 36-4 and 36-5 for the line L2 and "40" for the data 36-5 for the line L3 on the assumption that the weighting is "100" for the data 36-3 (data d) which is most largely affected by heat. In the following Table 1, the heat storage state X(i) obtained by the above-mentioned addition is shown in 16 stages from 1 to 16 in accordance with the state of printing, in which X(i)=1 means the state where the heat storage is largest.

TABLE 1

| DATA | | | | | | | | |
|---|---|---|---|---|---|---|---|---|
| 36-1 | 0 | 0 | 0 | 1 | 0 | 0 . . . 0 | 1 | 1 . . . 1 |
| 36-2 | 0 | 0 | 0 | 0 | 1 | 0 . . . 1 | 0 | 1 . . . 1 |
| 36-3 | 0 | 0 | 0 | 0 | 0 | 0 . . . 1 | 1 | 1 . . . 1 |
| 36-4 | 0 | 1 | 0 | 0 | 0 | 1 . . . 0 | 1 | 0 . . . 1 |
| 36-5 | 0 | 0 | 1 | 0 | 0 | 1 . . . 1 | 0 | 0 . . . 1 |
| 36-6 | 0 | 0 | 0 | 0 | 0 | 0 . . . 0 | 0 | 0 . . . 1 |
| X(i) | 1 | 1 | 1 | 2 | 2 | 2 . . . 10 | 10 | 11 . . . 16 |

The X(i) operator 26 shown in FIG. 2 receives the printing data 25-1 to 25-3 for three lines and derives the six data 36-1 to 36-6 which are used as address information (0 or 1) to compute the heat storage state with the contents of Table 1.

Figure 5:
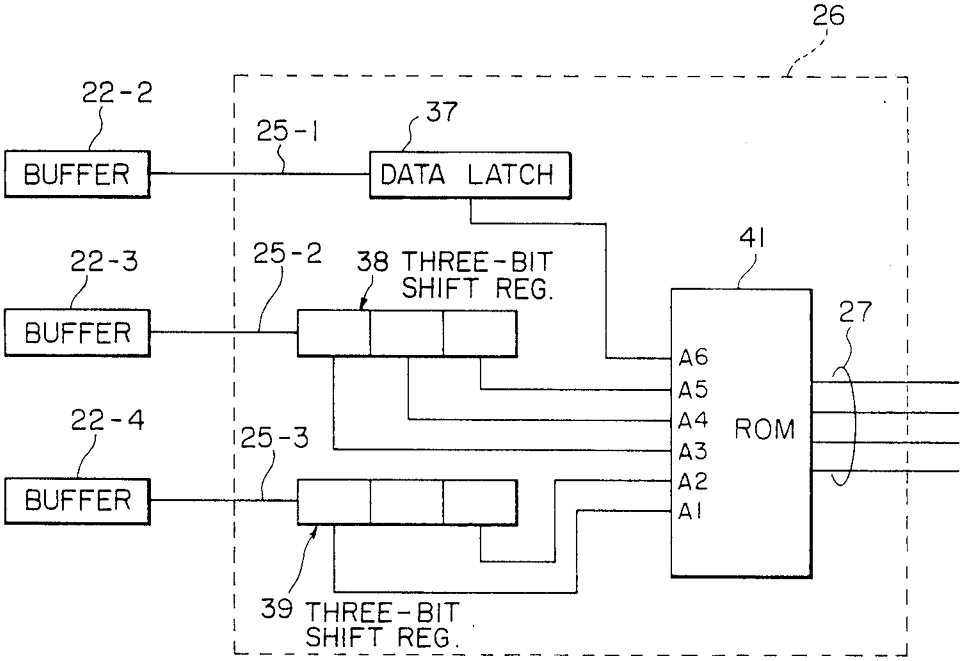
FIG. 5 is a block diagram showing a main part of the X(i) operator of the circuit of FIG. 2.

FIG. 5 is a block diagram for explaining the X(i) operator computing the heat storage state at the data D by using Table 1. The drawing shows the step in which the selector 23 shown in FIG. 2 is connected to the first line buffer 22-1. In this step, the three line buffers 22-2 to 22-4 are supplied with not-shown clock pulse so as to begin to read printing data, in synchronism with each other, bit by bit, by one line. The two-lines before printing data 25-1 read out of the second line buffer 22-2 are inputted into the X(i) operator 26 and, after being delayed one bit by a not-shown delay element, inputted into a one-bit data latch 37. The data 25-2 and 25-3 for one line before and the line onto which printing is now going to be performed respectively read out of the third and fourth line buffers 22-3 and 22-4 are inputted into corresponding three-bit shift registers 38 and 39 respectively. The data latched in the data latch 37 is applied bit by bit to an address terminal A6 of a ROM (read only memory) 41. The three-bit shift register 39 performs serial-to-parallel conversion and successively applies the data to address terminals A5 and A3 of the ROM 41 in the order from the oldest data. The other three-bit register 39 applies the oldest data to an address terminal A2 and the newest data to an address terminal A1.

The contents of Table 1 are stored in the ROM 41. The address terminals A1 to A6 correspond to the data 36-1 to 36-6 respectively. The heat storage state X(i) obtained from Table 1 is supplied to the T(i) operator 28 as the operation output signals 27.

The T(i) operator 28 finds the pulse widths for the respective heater elements for the line before, by the output signals 31 supplied from the pulse width memory 29. Then the pulse widths T(i1) for the line onto which recording is now going to be performed are obtained from the heat storage state X(i) determined for the respective heater elements. The thus obtained pulse widths are corrected so as to finally determine the pulse widths T(i2).

Figure 6:
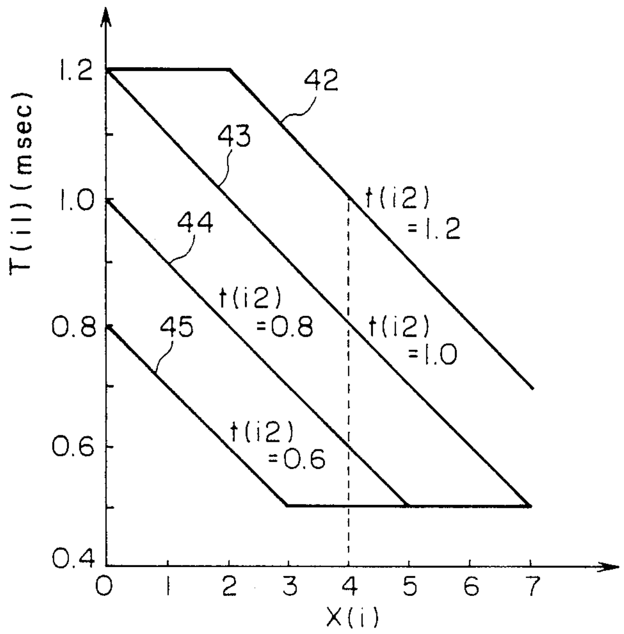
FIG. 6 is an explanatory diagram showing the relation between the heat storage state X(i) and the pulse width T(i1) in the T(i) operator of the circuit of FIG. 2.

FIG. 6 is for explaining the relation between the heat storage state X(i) and the pulse width T(i1) in this T(i) operator. The lines 42 to 45 show the characteristics when the finally determined pulse widths t(i2) for the line before assume the values (with the unit msec) as shown in the drawing. As an example, assume that the heat storage state X(i) is 4 with respect to a data. In this case, if the pulse width of a voltage applied to a heater element was 1.2 msec one line before, it will be reduced now to 1.0 msec, and if it was 0.6 msec, it will be reduced now to 0.5 msec.

Figure 7:
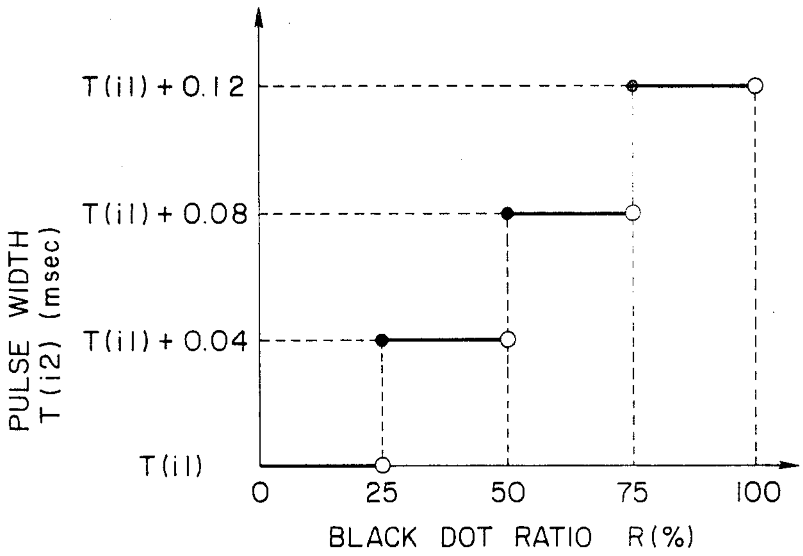
FIG. 7 is an explanatory diagram showing the relation between the black dot ratio R and the pulse width T(i2) in the T(i) operator of FIG. 6.

FIG. 7 shows the state of correction of pulse width by the black dot ration (%) in the T(i) operator. The counter 32 shown in FIG. 2 receives the printing data stored in the fourth line buffer 22-4 for the line onto which printing is now going to be performed, and counts the number of the black dots so as to produce the result of counting as a black dot ratio R. When the black dot ratio R is smaller than 25%, the pulse widths T(i1) obtained in FIG. 6 is used as it is as the final pulse widths T(i2). When the ratio R is equal to or larger than 25%, the correction is performed such that the pulse widths T(i2) is made longer in three stages.

Figure 8:
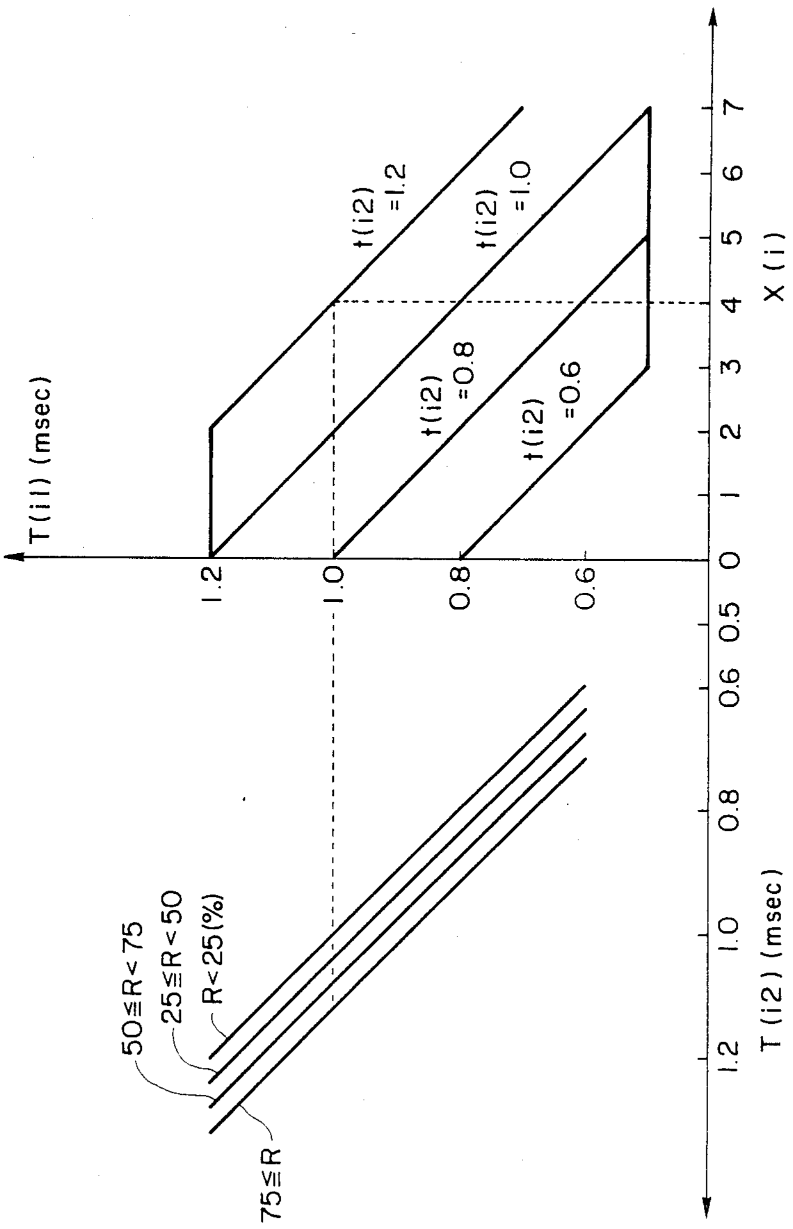
FIG. 8 is a characteristic diagram showing the input/output characteristic of the T(i) operator of the circuit of FIG. 2.

FIG. 8 is a combination of the above-discussed FIGS. 6 and 7 and shows the input/output relation of the T(i) operator which may be constituted by, for example, a ROM. Similarly to the above-mentioned example, assume that the heat storage state X(i) is 4 with respect to a data. Then, if the pulse width t(i2) of a voltage applied to a heater element was 1.2 msec one line before, it will be reduced now to 1.0 msec. At this time, if the black dot ratio R is smaller than 25%, the pulse widths T(i1) 1.0 msec is used as the T(i2) as it was. When the ratio R is equal to or larger than 75%, for example, the pulse widths T(i1) is expanded to 1.1 msec. The pulse signals 34 obtained corresponding to the bits of the printing data are supplied to the thermal head so that heat control is made with pulse widths for the respective heat elements differently from each other.

Figure 9:
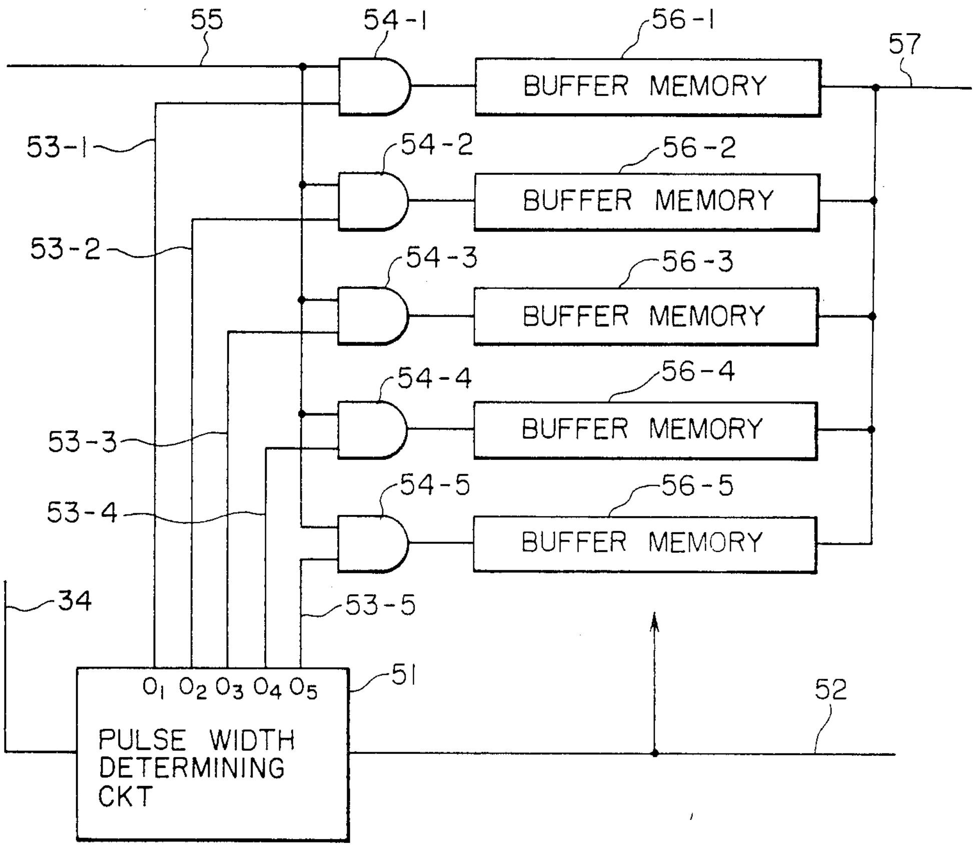
FIG. 9 is a block diagram of the pulse voltage appliance circuit for use in the circuit of FIG. 2.

FIG. 9 shows a pulse voltage applying circuit for performing such heat control. A pulse width determining circuit 51 in this pulse voltage applying circuit receives the pulse width signals 34 picture element after picture element in synchronism with a clock signal 52 and produces gate control signals 53-1 to 53-3 from its output terminals $O_1$ to $O_5$ respectively in accordance with the pulse widths. The pulse width determining circuit 51 classifies the pulse widths into five stages from 0.5 msec to 1.2 msec (that is 0.5, 0.6, 0.8, 1.0 and 1.2 msec) so as to control the amount of heat generation in the respective heater elements. When the pulse width is 0.5 msec, only the first gate control signal 53-1 is made to assume its high (H) level. When the pulse width is 0.6 msec, the first and second gate control signals 53-1 and 53-2 are made to assume their H level, and when it is 0.8 msec, the first to third gate control signals 53-1 to 53-3 are made to assume their H level. When the pulse width is 1.0 msec, the first to fourth gate control signals 53-1 and 53-4 are made to assume their H level, and when it is 1.2 msec, all the gate control signals 53-1 to 53-5 are made to assume their H level. When a pulse width which is different from the pulse widths of the above-mentioned five stages is obtained by the T(i) operator 28, any one pulse width near the obtained pulse widths is set.

The gate control signals 53-1 to 53-5 are respectively inputted into corresponding two-input AND gates 54-1 to 54-5. A printing data 55 delayed by a not-shown delay circuit and caused to correspond to the pulse width signals 34 and the respective heater elements is applied to the AND gates 54-1 to 54-5. The printing data 55 for one line has been completely supplied to each of the AND gates 54-1 to 54-5. The printing data for one line has been stored in the respective buffer memories 56-1 to 56-5 in the form of pulse width data.

Figure 10:
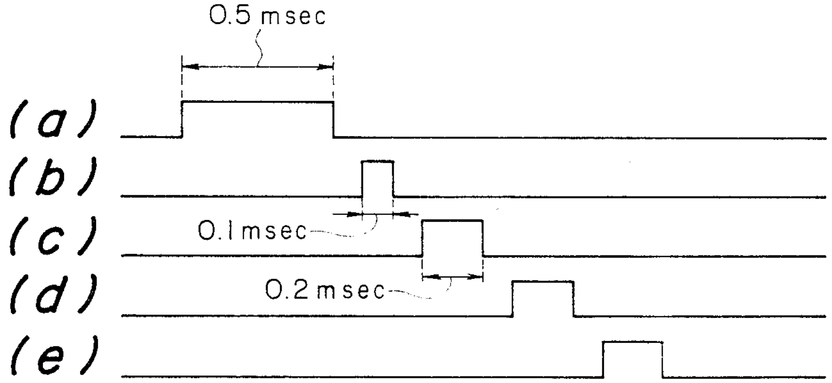
FIG. 10 is a time chart showing timing for pulse voltage application in the circuit of FIG. 9.

The thus stored data is supplied to a drive section of the thermal head as a pulse width control data. In the drive section, the contents of the first buffer memory 56-1 are first set in a shift register (not shown) of the thermal head so as to cause it to perform printing with a 0.5 msec applied voltage, as shown in FIG. 10(*a*). Then the contents of the second buffer memory 56-2 are set in the above-mentioned shift register so as to cause it to perform printing with a 0.1 msec applied voltage, as shown in FIG. 10(*b*). Applying the same rule correspondingly to the following, the contents of the third to fifth buffer memories 56-3 to 56-5 are successively set in the shift register to thereby successively perform 0.2 msec voltage application (FIG. 10 (*c*) (*e*)). As the result of this, for example, in a heater element which performs printing with 0.8 msec pulse width, current conduction is effected three times over FIG. 10 (*a*) (*c*) so that it is heated to a desired temperature.

Although the black dot signal 33 representing the result of counting of the counter 32 is supplied to the T(i) operator 28 in the embodiment described above, it may be alternatively supplied to the X(i) operator 26. In the latter case, the proportion of simultaneously energized heater elements is utilized as a fundamental data of the heat storage state. Further, the pulse width is determined on the basis of the black dot ratio R in the described embodiment, it may be of course determined, alternatively, by directly using a signal representing the number of black dots or the number of dots to be printed.

What is claimed is:

1. A thermal head drive circuit with the input connected to a source of printing data, and the output connected to a thermal head including individually actuatable and heatable heater elements, for printing successive lines comprising:

a. a pulse-applying circuit connected to the input of said thermal head for receiving pulse energy signals and applying printing pulse energy data to said thermal head;

b. storage means into which printing data from said printing data source are successively read line by line;

c. a heat storage state operator connected to the output of said storage means;

d. a counter connected to the output of said storage means for counting the number of dots in the line next to be printed;

e. a memory for storing the pulse energy signals used in printing a line immediately previous to said next to be printed line; and f. pulse energy operator means for computing the pulse energy signals to be applied to each of said heater elements, the inputs of said pulse energy operator means being connected to the outputs of said heat storage state operator, said memory and said counter, and the output of said pulse energy operator means being connected to the input of said pulse-applying circuit.

2. A thermal head drive circuit as recited in claim 1 wherein said storage means comprises:

a. a plurality of line buffers into which printing data are successively read line by line;

b. a first selector for cyclically selecting an input of one of said plurality of line buffers;

c. a second selector connected to the output of said plurality of line buffers and to the input of said heat storage operator, for selecting the output sides of the ones of said plurality of line buffers not being selected by said first selector.

3. A thermal head drive circuit as recited in claim 2 wherein said heat storage state operator comprises means for computing the heat storage state using the output data from said second selector.

4. A thermal head drive circuit as recited in claim 3 wherein said means for computing the heat storage state comprises a read-only memory.

5. A thermal head drive circuit as recited in claim 1, wherein a pulse width varies with said pulse energy signals.

6. A thermal head drive circuit as recited in claim 1, wherein a pulse amplitude varies with said pulse energy signals.

7. A thermal head drive circuit as recited in claim 1, wherein said pulse energy operator means comprises:

a. an input into which heat storage state data from said heat storage state operator are read, wherein said heat storage state data are represented by X(i);

b. an input into which pulse width data, t(i2), from said next previously printed line are read from said memory;

c. an input into which black dot ratio output data are read, wherein said black dot ratio output data are represented by R;

d. printing pulse width wherein said printing pulse width is represented by T(i1);

e. means for setting values for said printing pulse width T(i1) according to a predetermined relationship between the values of heat storage data X(i) and said next previously printed line pulse width data t(i2); and f. a means for forming output pulse width data, said output pulse width data being denoted as T(i2), according to a predetermined relationship between T(i1) and R.

8. A thermal head drive circuit as recited in claim 7, wherein said pulse energy operator means further comprises a read only memory.

9. Thermal head drive circuit as recited in claim 1, wherein said pulse applying circuit comprises:

a. pulse energy determining circuit into which output pulse energy signals from said pulse energy operator means are read;

b. plurality of AND gates into which gate control signals are read from said pulse energy determining circuit; and c. plurality of buffer memories into which thermal head printing data are read from said AND gates and with an output of said buffer memories connected to a drive section of said thermal head.

10. Pulse applying circuit as recited in claim 9, wherein said plurality of buffer memories comprise:

a. first buffer memory connected to an input of a shift register of said thermal head, wherein a first signal from said first buffer memory causes said thermal head to print with a first pulse;

b. second buffer memory connected to an input of said shift register of said thermal head, wherein a second signal from said second buffer memory causes said thermal head to print with a second pulse in addition to said first pulse;

c. third buffer memory connected to an input of said shift register of said thermal head, wherein a third signal from said third buffer memory causes said thermal head to print with a third preset pulse in addition to said first pulse plus said second pulse;

d. fourth buffer memory connected to an input of said shift register of said thermal head, wherein a fourth signal from said fourth buffer memory causes said thermal head to print with a fourth pulse in addition to said first through third pulses; and e. fifth buffer memory connected to an input of said shift of said thermal head, wherein a fifth signal from said fifth buffer memory causes said thermal head to print with a fifth pulse in addition to said first through fourth pulses.

* * * * *